Nov. 29, 1966

J. A. AMATO 3,288,987

DIGITAL COMPARATOR

Filed Dec. 9, 1963

4 Sheets-Sheet 1

INVENTOR.
JOSEPH A. AMATO
BY
S. C. Yeaton
ATTORNEY

Nov. 29, 1966 J. A. AMATO 3,288,987

DIGITAL COMPARATOR

Filed Dec. 9, 1963 4 Sheets-Sheet 2

INVENTOR.
JOSEPH A. AMATO
BY S. C. Yeaton
ATTORNEY

INVENTOR.
JOSEPH A. AMATO
BY S. C. Yeaton
ATTORNEY

Nov. 29, 1966 J. A. AMATO 3,288,987

DIGITAL COMPARATOR

Filed Dec. 9, 1963 4 Sheets-Sheet 4

INVENTOR.
JOSEPH A. AMATO
BY S. C. Yeaton
ATTORNEY 3,288,987
DIGITAL COMPARATOR Joseph A. Amato, Queens Village, N.Y., assignor to Sperry Rand Corporation, Great Neck, N.Y., a corporation of Delaware Filed Dec. 9, 1963, Ser. No. 328,933
15 Claims. (Cl. 235—177)

This invention relates to systems for comparing electrical signals and more particularly to systems for comparing binary coded numbers.

Computations with digital computers often require a comparison to be made between two numbers to determine if they agree within a specified tolerance.

In certain navigational computers, for example, a fractional digital computer may be used to derive a number that represents latitude or longitude. This computed number must then be compared with individual entries from a large bank of stored numbers in order to determine if the computed number agrees with some one of the stored numbers within a specified tolerance limit. The numbers can be either positive or negative and the computed number can be either larger or smaller than the stored quantity.

The prior art discloses complex computer routines for effecting an exact comparison. A typical routine for accomplishing this result involves subtracting one number from the other, then subtracting this result from the specified tolerance, and finally sensing the algebraic sign of the difference obtained from the latter subtraction. This procedure is complicated by the fact that an algebraic difference must be obtained from the first subtraction so that the signs as well as the relative magnitudes of the quantities must be considered. This in turn requires additional complementing apparatus that can be conditionally applied to the first difference.

It is an object of the present invention to provide a digital comparator that may effect a comparison within selected tolerance limits.

It is another object of the invention to provide a digital comparator that can be used with any combination of positive and negative numbers.

It is still another object of the present invention to provide a digital comparator that employs a minimum of components.

Two binary numbers are compared according to the principles of the present invention by selecting a desired tolerance equal in value to one of the binary digits comprising the number, subtracting one number from the other, and generating a comparison indication signal if all of the resultant difference bits having an order of significance equal to or greater than the selected tolerance are the same.

The principles and operation of the invention can be understood by referring to the following description taken in connection with the drawings wherein.

Consider an application employing a conventional fractional digital computer in which negative binary numbers are presented as the two's complement of the corresponding positive binary numbers. The first bit in each binary number is reserved for indicating the algebraic sign of the number. Thus, if the first bit is a ZERO, the number has a positive sign. If the first bit is a ONE, the number has a negative sign. The remaining digits represent the value of the number in descending order of significance $(2^{-1}+2^{-2}+2^{-3} \ldots +2^{-n})$.

Thus a number having a decimal value of 0.375 would be equivalent to $(2^{-2}+2^{-3})$ and would appear as 00110 where the first "0" is the sign bit, whereas −0.375 would be represented as 11010 where the first "1" is the sign bit.

If the difference between two binary numbers is less than the value of a selected one of the binary digits, then all of the difference bits having an order of significance equal to and greater than the selected binary digit, as well as the sign bit, will be the same.

An example will make this clear. Suppose that a value of 0.46875 has been stored in a memory unit and it is desired to know if a computed value of 0.37500 compares with this stored value within a tolerance of 0.125. The stored value, 0.46875, is equal to 001111 in binary form, where the first "0" is a sign bit. The computed number 0.37500 has the binary value of 001100 where the first "0" is again a sign bit. The allowable tolerance 0.125 is equal to $2^{-3}$ or three significant places in the binary form. Subtracting the computed from the stored binary number:

$$\begin{array}{r} 001111 \\ 001100 \\ \hline 000011 \end{array}$$

Thus the difference bits having a significance equal to and greater than the selected tolerance as well as the sign bits are all ZEROES. Furthermore, it can be seen that if the larger number were subtracted from the smaller, the difference bits equal to and greater than the selected tolerance would all be ONES.

Similarly, the same pattern holds true if one or both numbers are negative. In working with values near zero, one of the numbers may be positive and the other negative although the two are still within the desired tolerance limits. For example, it may be desired to determine if a stored value of −.09375 (111101) compares with +.06250 (000010) within a tolerance of 0.25. This tolerance is equal to $2^{-2}$ or two significant places in the binary code.

Subtraction of the smaller absolute value from the larger will yield 111011 and thus indicates a comparison since the two significant bits and the sign bit will all be ONES. Reversing the order of subtraction will yield a result of 000101. The two significant difference bits and the sign bit in this case are all ZEROES.

Figure 1:
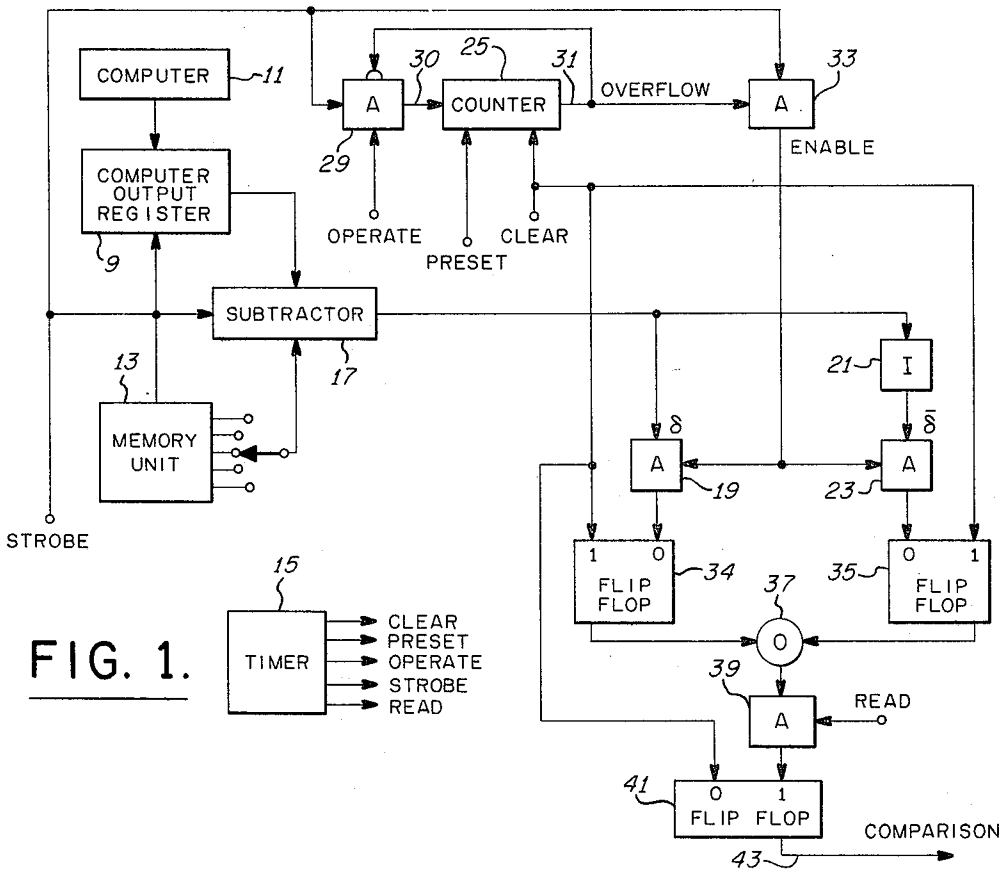
FIG. 1 is a block diagram representing one embodiment of the invention.

A comparator operating according to these principles is shown in FIG. 1, wherein a computed binary number, temporarily stored in an output register 9 of a computer 11 is to be sequentially compared with individual binary numbers stored in the memory unit 13. The memory unit may typically comprise a conventional magnetic drum storage system. However, for purposes of illustration this unit has been shown functionally in block form with a selector switch to indicate that the word stored in the computer output register may be compared with selected binary numbers in the memory unit. Individual bits of information comprising the binary number in the computer register and a selected binary number in the memory unit are read out of these two units simultaneously and in order of increasing significance in response to strobe pulses from a conventional timer circuit 15.

Information from the two sources is conveyed to a conventional series full subtractor 17. Subtractor output signals representing a binary one (or positive difference) actuate an AND gate 19. Subtractor output signals representing a binary zero (or negative difference) pass through an inverter 21 and actuate an AND gate 23.

A predetermined pulse counter 25 is used to select those bits of information which are to be compared by discriminating between non-tolerance bits which have a significance less than the selected tolerance limit and tolerance bits which have a significance equal to or greater than the selected limit.

This pulse counter, which will be described in detail, may be preset by means of a CLEAR signal and a PRESET signal from the timer 15 to produce an output or overflow voltage after a selected number of input pulses have been received. Input pulses are introduced to the counter from an inhibitor 29 by way of a line 30. The inhibitor 29 has the property of passing a strobe signal only during those times that an OPERATE signal exists but no overflow signal exists. The counter output is conducted through an overflow line 31 to another AND gate 33. The inhibitor 29 is connected to receive an OPERATE signal from the timer 15 during the comparison cycle. The inhibitor 29 is connected to receive strobe pulses from the timer 15 and inhibit signals from the overflow line 31. The gate 33 passes an ENABLE signal when an overflow voltage from the counter 25 is accompanied by a strobe pulse from the timer 15. The ENABLE signal is conveyed to both of the AND gates 19 and 23. The output of the gate 19 is connected to a flip flop 34 so as to set this flip flop to the zero state when an output signal appears at that gate. The gate 23 is connected to a flip flop 35 in a similar fashion. These flip flops are connected through an OR gate 37 and an AND gate 39 to another flip flop 41. This gate 39 is also constructed to receive a READ pulse from the timer 15 at the end of the comparison operation. These circuits are connected to the flip flop 41 so that if either of the flip flop 34 or 35 are in the one state when a READ pulse occurs, then the flip flop 41 will be switched to its one state and a comparison output signal will appear on the line 43.

Figure 2:
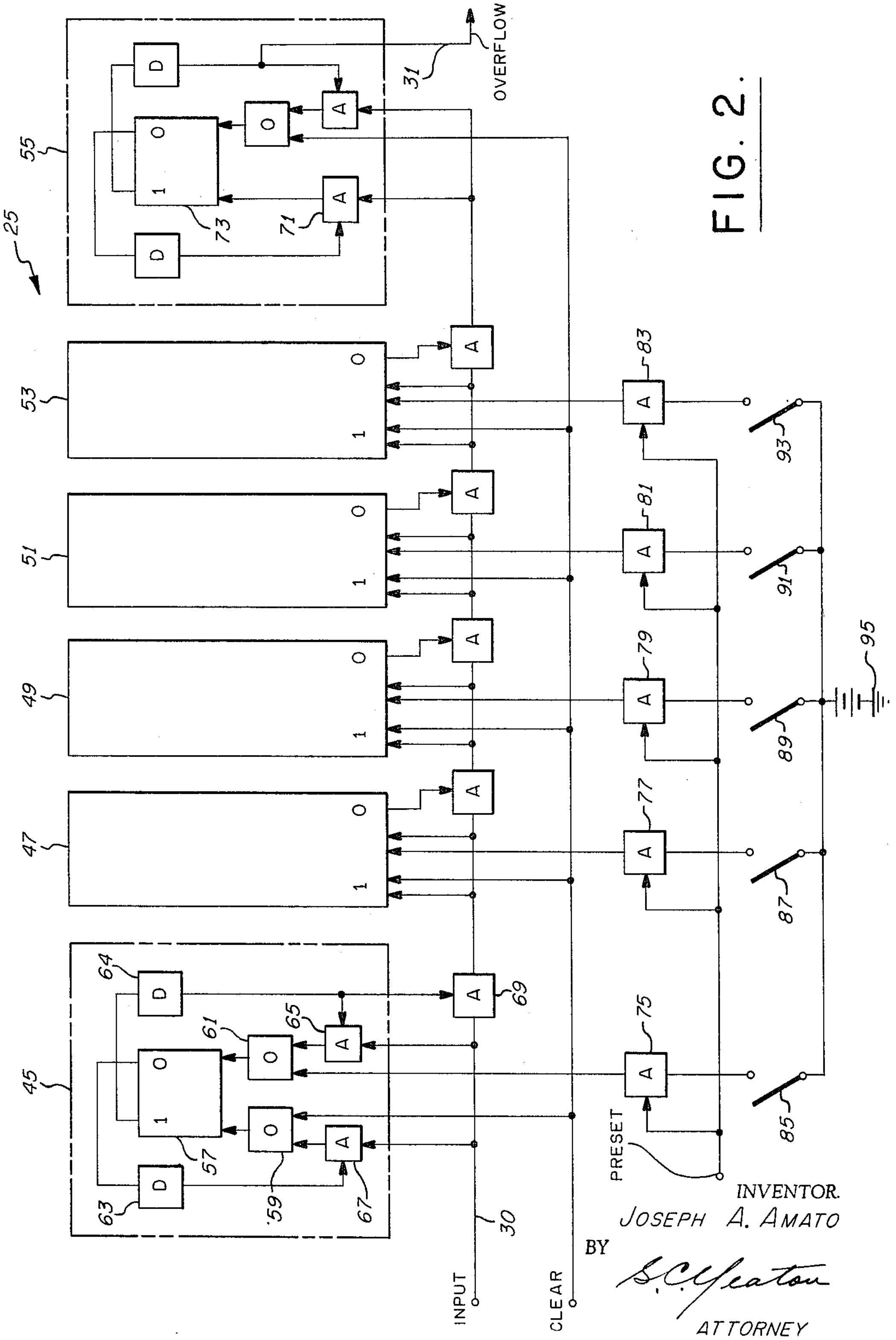
FIG. 2 is a block diagram of a counter circuit used in the invention.

A specific predetermined pulse counter that may be used in practicing the invention is shown in FIG. 2. This counter employs an input stage 45, four intermediate stages 47, 49, 51, and 53, and an output stage 55. The four intermediate stages have been shown in block form since they are identical with the input stage 45.

The input stage contains a flip flop circuit 57. An OR gate 59 is connected to set the flip flop to the one state when a signal is passed by this gate. A second OR gate 61 is connected to set the flip flop to the zero state when a signal passes through this gate. First and second delay networks 63 and 64 are connected to the ZERO and the ONE output terminals of the flip flop respectively. These delay networks are adjusted to provide a delay time greater than the duration of the input pulses being applied to the counter through the line 30. An AND gate 67 is connected to pass a signal to the OR gate 59 when actuated by a signal from the delay network 63 and an input pulse from the line 30. Similarly, an AND gate 65 is connected to pass a signal to the OR gate 61 when actuated by a signal from the delay network 64 and an input pulse from the line 30. A third AND gate 69 is connected to pass a signal to subsequent stages in response to an input pulse from the line 30 and a signal from the delay network 64. The output stage 55 is similar to the earlier stages, however, an overflow line 31 is connected to one of the delay networks so as to provide an overflow signal after this stage is switched to the one state. Furthermore, the AND gate 71 is connected directly to the flip flop 73 rather than to an OR gate as is the case in the earlier stages.

A CLEAR signal from the timer 15 is conducted to an OR gate in each stage to set all of the stages except the output stage to the one state. This line is connected to the signal OR gate in the output stage so that the CLEAR signal sets this stage to the zero state.

A PRESET signal from the timer 15 is coupled to each stage except the output stage through the individual AND gates 75, 77, 79, 81, and 83. These AND gates are also connected to receive signals from a selective switching means shown functionally in the figure as the individual manual switches 85, 87, 89, 91 and 93. The signal applied to these switches may be derived from any convenient source depicted functionally as a battery 95.

The counter is basically a conventional binary counter. However, the CLEAR signal is coupled to the counter stages so as to switch these stages to a count of one less than the value necessary to switch the output stage 55. This is done so that if a CLEAR signal but no PRESET signal is applied, the first subsequent input pulse will switch the last stage of the counter and cause an overflow signal to be generated.

The selective switching means is set according to the number of input pulses to be accepted by the counter before an overflow occurs.

Assume as an example that a twelve digit binary number is to be compared within eight significant binary digits. Since these numbers are applied to the subtractor in order of increasing significance, the counter must accept four strobe pulses and then overflow so as to prevent the fifth and succeeding pulses from reaching the counter. In the example assumed, the counter would first be cleared by means of a CLEAR signal from the timer 15. This would leave the counter with a count of 111110. The switches 85 and 87 would then be closed and a PRESET pulse applied. This would switch the first and second stages, leaving the counter with a count of 001110.

The first input pulse will then switch the input stage to the one state and cause a signal to appear at the ONE output terminal of the flip flop. This signal will be delayed by the delay network 65 until after the input pulse has disappeared so that this input pulse cannot pass through the gate 69. The second pulse, however, switches the input stage to the zero state and passes through the gate 69 so as to switch the second stage to the one state. The third pulse again switches the first stage to the one state and leaves the counter with a count of 111110. The fourth input pulse can then reverse all of the stages and cause an overflow signal to appear on the line 31 after a time interval determined by the delay network connected to the one output terminal of the flip flop 73.

Figure 3:
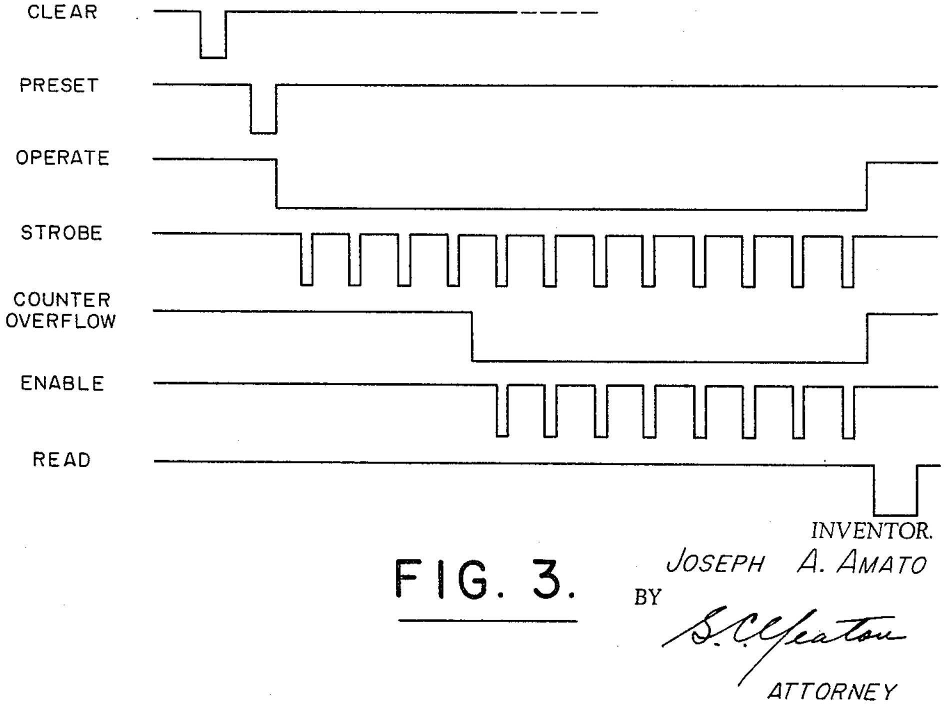
FIG. 3 is a chart showing various waveforms used in the embodiment of FIG. 1.

The operation of the invention can be understood by referring to the timing diagram of FIG. 3 together with the block diagrams of FIGS. 1 and 2.

Assume that a twelve bit binary number is temporarily stored in the computer register 9 and that this binary number is to be compared with individual binary numbers from the memory unit 13 within a tolerance of eight significant binary digits.

The selector on the memory unit 13 will be set to compare a first selected binary number in this unit with the computed binary number.

CLEAR and PRESET pulses will first be applied in the same manner as that previously described with relation to the counter. However, the CLEAR pulse will not only set the counter to the 111110 state, but will also switch the flip flops 34 and 35 to the one state and the flip flop 41 to the zero state. The PRESET pulse will again switch the counter to the 001110 state. An OPERATE command signal is next applied to the inhibitor 29 to initiate the actual comparison cycle. The following four strobe pulses then pass through the inhibitor 29 to the connecting line 30 and finally to the counter 25. These pulses leave the counter with a count of 000001. This produces an overflow voltage on the line 31 after an appropriate delay. These four strobe pulses also cause a readout of the first four digits of the binary number stored in the computer register 11 and the selected binary number stored in the memory unit 13. The subtractor generates output signals in response to this readout. However, since there is no overflow signal on the line 31 until after the termination of the fourth pulse, there can be no ENABLE signal. Therefore, the output signals from the subtractor cannot reach the flip flops 34 and 35 and the first four least significant or "non-tolerance" bits of the stored and computed numbers are effectively disregarded.

The fifth and subsequent strobe pulses are accompanied by an overflow signal. This overflow signal is applied to the inhibit terminal of the inhibitor 29 so as to prevent these strobe pulses from reaching the counter. The overflow signal is also applied to the gate 33. This permits the fifth through the twelfth strobe pulses to pass through this gate so as to appear as ENABLE pulses on the input terminals of the AND gates 19 and 23. These strobe pulses also cause a readout of the significant or "tolerance" bits from the register 9 and the memory 13. Thus only positive difference tolerance bits are applied to the flip flop 34 and only negative difference tolerance bits are applied to the flip flop 35.

Assume, now, that the subtractor produces negative difference signals for each of the first three tolerance bits. A signal will appear at the output of the inverter 21 during each of the three corresponding strobe pulse intervals. These pulses will be accompanied by an ENABLE pulse at the gate 23. The first of these pulses will switch the flip flop 35 to the zero state. Since none of these pulses will actuate the gate 19, however, the flip flop 34 will remain in the one state. If the subtractor now produces a positive difference signal for the fourth tolerance pulse, a signal will be applied to the gate 19. This will be accompanied by the ENABLE signal so that the flip flop 34 will be switched to the zero state. Both flip flops 34 and 35 will now be in the zero state and cannot be influenced by future pulses during the comparison cycle. A READ pulse is applied to the gate 39 to terminate the first comparison cycle. Since this READ pulse is not accompanied by a signal from either flip flop 34 or 35, the flip flop 41 will remain in the cleared or zero state so that no comparison signal will appear on the line 43.

The switch on the memory unit will now be moved so as to read out a second word stored in that unit. A CLEAR signal will be applied to the counter 25 and the various flip flops. Another PRESET signal will be applied to the counter, and finally an OPERATE signal will be applied to the inhibitor 29 to initiate the second comparison cycle.

Assume that in this case the subtractor produces a positive difference signal for each tolerance bit read out of the register and memory units. Each of these positive difference signals will pass through the gate 19 to the flip flop 34. The first of the resulting difference bits from the gate 19 will have switched the flip flop 34 to the zero state and subsequent bits will have no effect on the flip flop. Since none of these signals will have passed through the inverter 21, the flip flop 35 will remain in the one state all during the comparison cycle.

When the READ pulse is applied to the gate 39 it will be accompanied by a signal from the flip flop 35 and serve to switch the flip flop 41 to the one state and thus produce a comparison signal on the line 43.

If in the latter case the subtractor 17 had produced negative difference signals for all of the corresponding tolerance bits, the flip flop 35 would have been switched to the zero state, but the flip flop 34 would remain in the one state. The following READ pulse would have been accompanied by a signal from the flip flop 34 so that the flip flop 41 would have been switched and a comparison signal would again be applied to the line 43.

When a selected binary number does not compare with the computed number within the selected tolerance, the comparison cycle is repeated using successive binary numbers from the memory unit until a comparison is indicated. CLEAR and PRESET pulses are applied to the counter before the start of each new comparison cycle.

Figure 4:
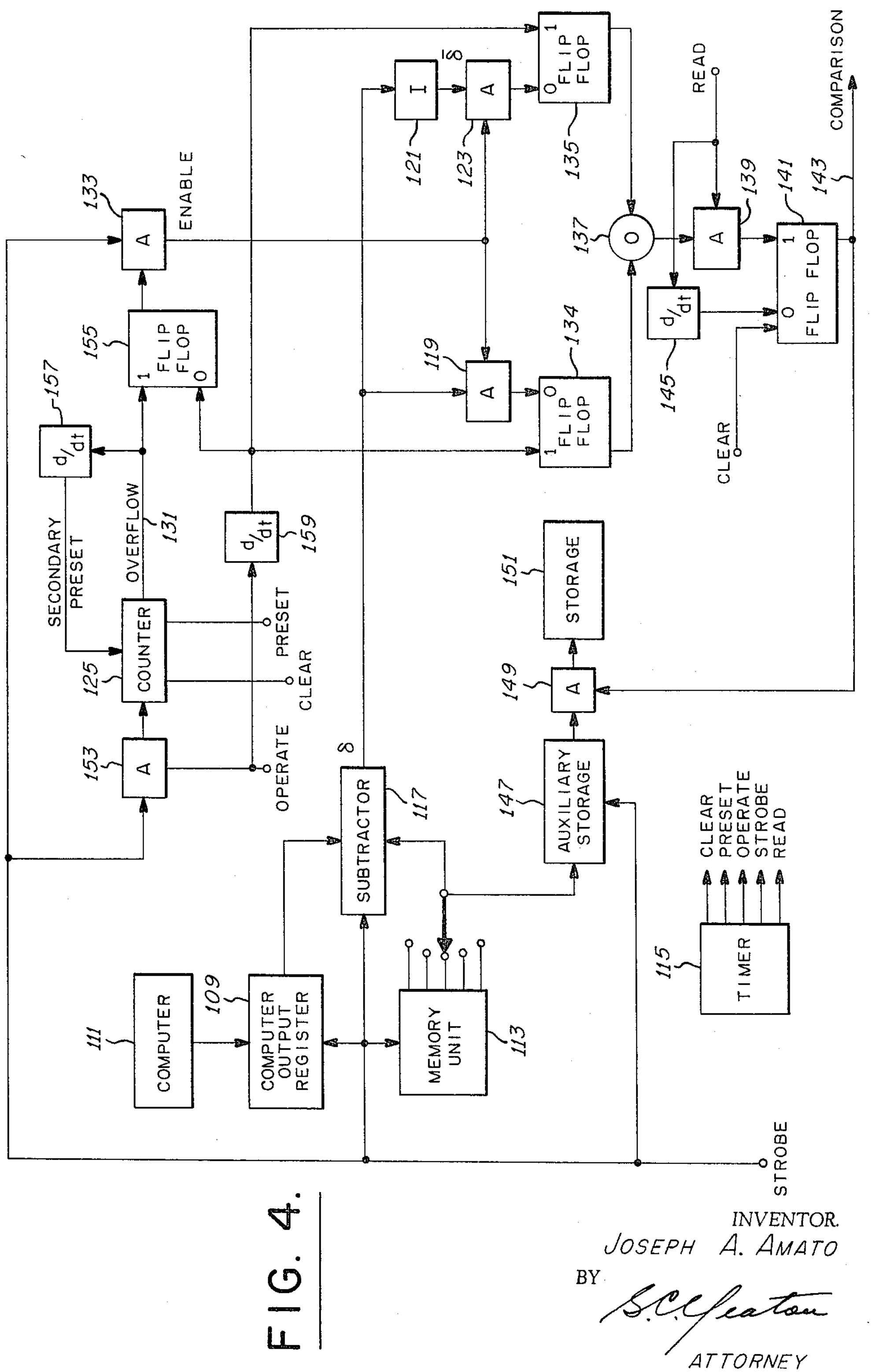
FIG. 4 is a block diagram representing a presently preferred embodiment of the invention.

FIG. 4 depicts a second embodiment of the invention.

This embodiment is basically the same as the embodiment described with respect to FIG. 1, however the embodiment of FIG. 4 employs a pulse counter which is automatically preset during the comparison cycle. This obviates the need for delaying the start of a new comparison cycle while the counter is being cleared and preset after a previous comparison cycle has been completed.

The circuit of FIG. 4 is particularly useful in situations such as "table look-up" wherein a computed word must frequently be compared with a large number of words before a comparison within a selected tolerance is found.

In the circuit of FIG. 4, a computer output register 109 temporarily stores a computed word derived from a computer 111. This computed word is compared sequentially with words stored in a memory unit 113. Information is read out of these units in response to strobe pulses from a timer 115 and processed in a serial full subtractor 117. In formation from the subtractor is conveyed to an AND gate 119 and through an inverter 121 to a second AND gate 123. Difference bits from the AND gates 119 and 123 are conducted to the flip flops 134 and 135 respectively. Output voltages from these flip flops are conducted to an OR circuit 137. A third AND gate 139 is connected to receive output signals from the OR circuit 137 and READ pulses from the timer 115. Output signals from the AND gate 139 are conducted to the ONE input terminal of a flip flop circuit 141. These components are the same as the corresponding components used in the circuit of FIG. 1.

A READ pulse from the timer 115 is applied to the AND gate 139 at the end of each comparison cycle. This READ pulse is preferably a rectangular pulse of the same type pictured in FIG. 3. The READ pulse is also applied to a differentiating circuit 145. The output from this circuit is applied to the zero input terminal of the flip flop 141. If a comparison cycle produces no voltage from the OR circuit 137, the READ pulse at the end of this cycle can produce no output voltage from the AND circuit 139. This READ pulse, however, is differentiated by the circuit 145 and appears as a pulse at the ZERO input terminal of the flip flop 141. This leaves the flip flop 141 in the binary zero state.

If the comparison cycle produces a voltage at the output of the OR circuit 137, the following READ pulse will result in a voltage at the output of the AND circuit 139 which will tend to set the flip flop 141 to the binary one state. The same READ pulse will also be differentiated by the circuit 145 and tend to set the flip flop 141 to the binary zero state. These two pulses will momentarily offset each other. However, since the differentiated pulse lasts only during the buildup of the READ pulse, the flip flop 141 will eventually be switched to the binary one state by the action of a READ pulse and a voltage from the OR circuit 137.

The flip flop 141 can also be set to the binary zero state by means of a CLEAR signal applied from the timer 115 at the beginning of a series of comparison cycles.

Information from the memory unit 113 is strobed into an auxiliary storage means 147 at the same time that this information is strobed into the subtractor 117. The auxiliary storage means may be a conventional shift register. Information strobed out of the auxiliary storage means is conveyed to an AND gate 149. This AND gate is also connected to receive a comparison voltage when the flip flop 141 is in the binary one state. Information from the AND gate 149 is conveyed to a storage unit 151.

Before the first of a series of comparison cycles is to begin, CLEAR and PRESET pulses from the timer 115 are applied to a predetermined pulse counter 125 in the same way as described in relation to the embodiment of FIG. 1. These pulses leave the counter in a state such that the last-non-tolerance bit applied to the counter produces an overflow. In the circuit of FIG. 4, these pulses are applied only before the first comparison cycle is to begin, as opposed to the circuit of FIG. 1 in which CLEAR and PRESET pulses must be applied before each comparison cycle is to begin.

An OPERATE signal from the timer 115 initiates a comparison cycle. This signal passes through a differentiating circuit 159 and sets a flip flop 155 to the binary zero state. The differentiated OPERATE signal also sets the flip flops 134 and 135 to the binary one state. The OPERATE signal further permits strobe pulses to pass through the AND gate 153 during the comparison cycle.

The last non-tolerance bit in the first comparison cycle switches the final stage of the counter to the binary one state and produces an overflow voltage. This overflow voltage switches the flip flop 155 to the binary one state and permits ENABLE pulses to be formed at the output of the AND gate 133 in response to subsequent strobe pulses in the comparison cycle.

When an overflow voltage occurs, it is differentiated in the circuit 157 and causes a secondary preset pulse to be applied to the counter 125. This resets the counter and extinguishes the overflow voltage. The flip flop 155 continues to produce an output voltage, however, so that ENABLE pulses can be provided for the remainder of the comparison cycle.

It will be noticed that the counter of FIG. 4 counts every pulse in every comparison cycle. This is opposed to the operation of the counter in FIG. 1 in which the inhibitor 29 permits only the non-tolerance pulses to be counted.

Since the overflow voltage in either case must occur just before the first tolerance pulse is processed, the secondary preset pulse must reset the counter of FIG. 4 to a count such that the number of tolerance pulses during the first comparison cycle plus the number of non-tolerance pulses in the following comparison cycle will advance the counter to a state such that it will just produce another overflow voltage.

Stated algebraically, the secondary preset pulse must leave the counter with a decimal count of $2^{(M-1)}-n$ where M is the number of stages in the counter and $n$ is the number of bits in the computed word.

The secondary preset pulse is applied to appropriate counter stages through the same type of selection means used with the original PRESET pulse and described in relation to FIG. 2.

Figure 5:
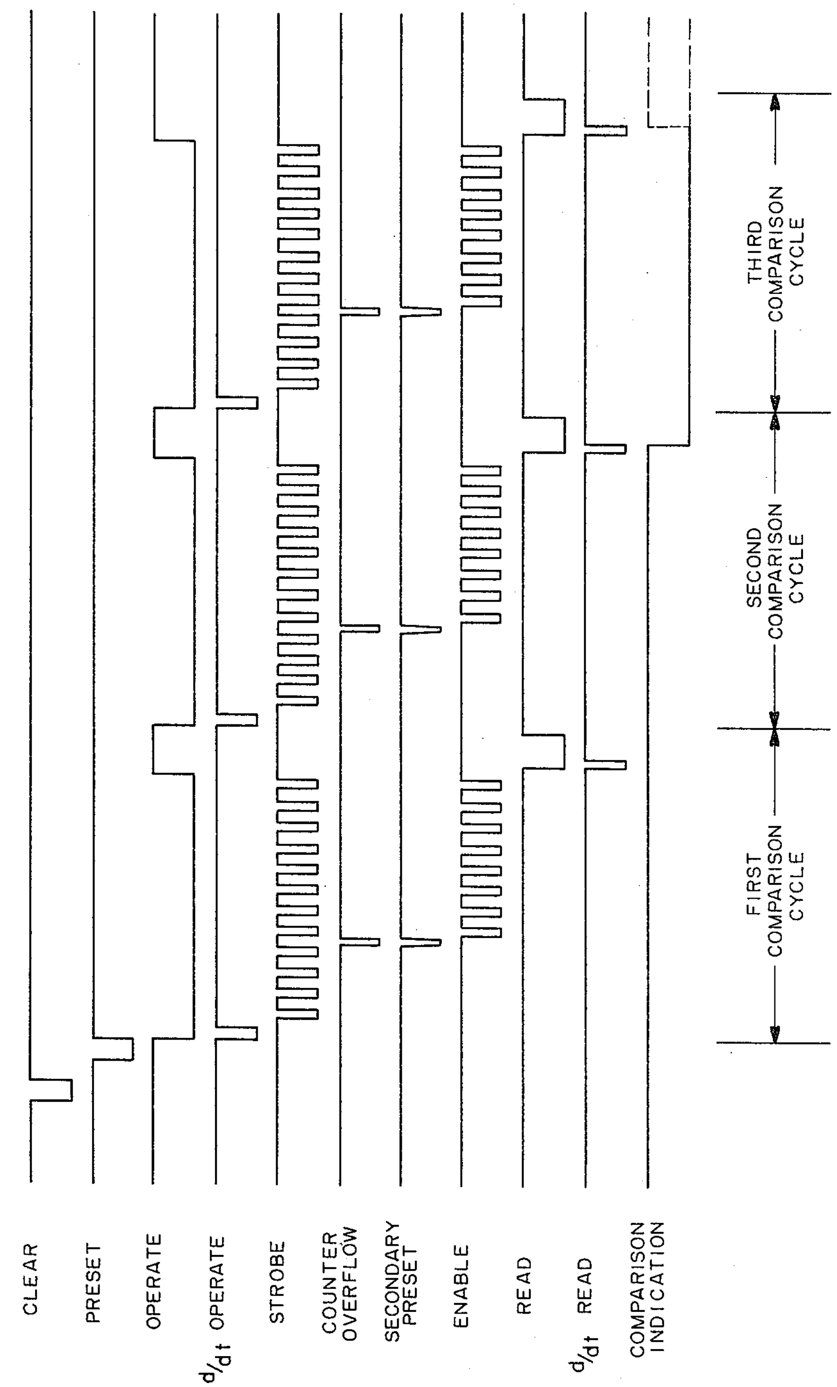
FIG. 5 is a chart showing various waveforms occurring in the embodiment of FIG. 4.

The sequence of events which permits the circuit of FIG. 4 to perform an uninterrupted series of comparisons may be visualized by referring to the timing diagram of FIG. 5 together with the circuit of FIG. 4. FIG. 5 represents the voltage relationships occurring during several comparison cycles.

Assume as an example that a six-stage counter is to be employed, and a twelve-bit word is to be compared within eight significant digits.

The memory unit 113 will be set to read out a first stored word. A CLEAR signal will be applied to the counter. This will set the counter to a reading of 111110. This signal will also set the flip flop 141 to the binary zero state. A PRESET pulse will next be applied to the counter and leave the counter with a count of 001110 (equivalent to a decimal value of 28).

The first comparison cyle is started by applying an OPERATE voltage. This signal is differentiated in the circuit 159 and applied to the flip flops 134, 135 and 155.

The fourth pulse applied to the counter represents the last non-tolerance pulse in the first comparison cycle. This sets the counter to the 000001 state and causes an overflow voltage to appear. This overflow voltage sets the flip flop 155 to the binary one state and enables the gate 133.

The overflow voltage also produces a secondary preset signal which sets the counter to a decimal count of $2^5-12$ or 20. The eight tolerance pulses remaining in the first comparison cycle advance the counter to a decimal count of 28.

While strobe pulses are being applied to the counter, information is also being read out of the register 109 and the memory unit 113. The information read out of the memory unit is read into the subtractor 117 and also into the auxiliary storage unit 147.

If the word from the memory unit 109 which is selected for the first comparison cycle does not agree within the specified tolerance limit, there will be no output from the OR circuit 137 at the end of this comparison cycle and the flip flop 141 will not be switched when the READ purse occurs.

A second OPERATE voltage from the timer 115 will initiate the second comparison cycle. This OPERATE signal sets the flip-flops 134, 135, and 155 to their respective cleared states.

The selection means on the memory unit 113 is advanced to read out a second stored word at this time. This can be accomplished by any conventional means such as a stepping switch responsive to the beginning of the OPERATE pulse.

The counter at this time will still contain a decimal count of 28.

Fresh information is read out of the memory unit and into the auxiliary storage means in response to the strobe pulses during this second comparison cycle. The information originally stored in the storage means 147 is read out at the same time, however this information cannot pass through the AND gate 149.

The first four strobe pulses representing the four non-tolerance bits in the second comparison cycle advance the counter to a decimal count of 32 (000001). This causes an overflow that switches the flip flop 155 and enables the AND gate 133 in time to provide ENABLE pulses for the tolerance bits to follow in this comparison cycle.

The overflow voltage also produces a secondary preset pulse which again resets the counter to a decimal count of 20 so that this counter can again build up to the proper count in the next comparison cycle.

Assume that the word stored in the memory which was chosen for the second comparison cycle compares with the computed word within the specified tolerance limits. A voltage output will appear at the OR gate 137 at the termination of the OPERATE voltage. The following READ pulse will result in a switching pulse at the ONE input terminal of the flip flop 141. The READ pulse also produces a switching pulse through the differentiating circuit 145. Since the differentiated pulse is of a short duration with respect to the original READ pulse, however, the flip flop 141 will remain in the binary one state.

The comparison voltage from the flip flop 141 will now be applied to the AND gate 149. This will permit the word which has been stored in the auxiliary storage means 147 and which has been shown to compare with the computed word to the strobed into the storage means 151 during the third comparison cycle.

The comparison voltage from the flip flop 141 will remain during the third comparison cycle. The differentiated READ pulse at the end of this comparison cycle will return the flip flop 141 to the ZERO state unless another comparison voltage is to be indicated.

Since arithmetic computers in general contain a subtraction means, it is possible to effect a time sharing operation in which the output from several arithmetic computers is processed sequentially using a common pulse counter.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A device for comparing two binary coded numbers comprising means to subtract one number from the other; means to select which digits in the output from said subtractor means are to be considered significant; means to provide a first steady switching signal until a significant positive difference output signal is produced by said subtractor means; means to provide a second steady switching signal until a significant negative difference signal is produced by said subtractor means; and means to provide a comparison signal in response to either of said steady switching signals.

2. A device for comparing two binary coded numbers comprising means to subtract one number from the other; means to select which digits in the output of the subtraction means are to be considered significant; means to produce an ENABLE pulse whenever a significant digit is supplied to the subtraction means; means to produce a first steady switching signal until the concurrence of an ENABLE pulse and a positive difference output signal from said subtraction means; means to produce a second steady switching signal until the concurrence of an ENABLE pulse and a negative difference output signal from said subtractor; and means to provide a comparison signal in response to either of said steady switching signals.

3. A device for comparing two binary coded numbers comprising means to subtract one number from the other; means to select which digits in the output of the subtraction means are to be considered significant; means to produce an ENABLE pulse whenever a significant digit is supplied to the subtraction means; means to provide a first steady switching signal until the concurrence of an ENABLE pulse and a positive difference output signal from the subtraction means; means to provide a second steady switching signal until the concurrent of an ENABLE signal and a negative difference output signal from the subtraction means; means to provide a READ pulse when each pair of corresponding digits in the two words have been compared; and means to provide a comparison indication signal in response to the concurrence of a READ pulse and either of the steady switching signals.

4. A device for comparing two binary coded numbers comprising means to store each of the numbers to be compared; means to read each of the numbers out of their respective storage means serially and in order of increasing significance; means to provide ENABLE pulses as digits are read out of the storage means; means to withhold said ENABLE pulses until the first significant digit is read out of the storage means; means to subtract one of the words to be compared from the other; means to provide a first steady switching signal until the concurrence of an ENABLE pulse and a positive difference output signal from the subtraction means; means to provide a second steady switching signal until the concurrence of an ENABLE pulse and a negative difference output signal from said subtraction means; means to provide a READ pulse after each pair of corresponding digits in the two words have been compared; and means to provide a comparison signal in response to the concurrence of a READ pulse and either of the steady switching signals.

5. A device for determining if a computed binary number compares with a stored number within a predetermined tolerance comprising means to select the number of significant binary digits corresponding to the predetermined tolerance; means to subtract one binary number from the other in serial sequence; means to supply a difference bit whenever the subtraction means provides a difference output voltage; means to supply an inverted difference bit whenever the subtraction means provides a negative difference output voltage; means to provide an ENABLE pulse while significant digits are being supplied to the subtraction means; means to supply a first steady switching signal after any coincidental occurrence of a difference bit and an ENABLE pulse; means to supply a second steady switching signal after any coincidental occurrence of an inverted difference bit and an ENABLE pulse; means to supply READ pulses; and means to indicate a coincidence of a switching signal and a READ pulse.

6. A device for comparing two binary coded numbers within a desired tolerance comprising a digital serial full subtractor; means for applying corresponding digits of the two numbers simultaneously and in order of increasing significance to the subtractor; means for selecting the number of significant digits corresponding to the desired tolerance; means for providing ENABLE pulses simultaneously with the application of the digits to the subtractor; means for withholding said ENABLE pulses until the significant digits are applied to the subtractor; means to provide positive difference bits when the subtractor produces a positive difference signal; means to provide inverted difference bits when the subtractor produces a negative difference signal; means to provide a first steady switching signal in response to the coincidental occurrence of a difference bit and an ENABLE pulse; means to provide a second steady switching signal in response to the coincidental occurrence of an inverted difference bit and an ENABLE pulse; means to provide a READ pulse at the end of a comparison cycle; and means to indicate the coincidence of a READ pulse and a steady switching pulse.

7. A device for comparing two binary numbers within a desired number of tolerance bits comprising means to store each of the numbers to be compared; a source of strobe pulses; means responsive to said strobe pulses to read each of the numbers out of their respective storage means serially and in order of increasing significance; means to count the number of bits read out of the storage means; means to preset said counting means so that a selected number of pulses will cause the counting means to overflow whereby the counter may be set to overflow after the last non-tolerance bit is read out of the storage means; means to produce ENABLE pulses in response to the strobe pulses occurring after said counting means overflows; means to subtract one of the words to be compared from the other; means to provide a first steady switching signal until the concurrence of an ENABLE pulses and a positive difference output signal from the subtraction means; means to provide a second steady switching signal until the concurrence of an ENABLE pulse and a negative difference output signal from said subtraction means; means to provide a READ pulse after each pair of corresponding digits in the two words have been compared; and means to provide a comparison signal in response to the concurrence of a READ pulse and either of the steady switching signals.

8. A device for comparing two $n$-digit binary coded words within a selected number of tolerance digits comprising a source of strobe pulses; a serial full subtractor; means responsive to said strobe pulses to read the words to be compared into said subtractor serially and in order of increasing significance; a pulse counter arranged to count the number of digits read into the subtractor; means to preset the counter to a predetermined state such that it will overflow after counting the last non-tolerance digit; means to produce a secondary preset pulse when a counter overflows; means responsive to a secondary preset pulse to reset the counter to a second state such that it will return to said predetermined state after counting an additional $n$ digits; means to produce an ENABLE pulse in response to each strobe pulse occurring after the counter overflows; means to produce a first steady switching signal until the concurrence of an ENABLE pulses and a positive difference output signal from said subtraction means; means to produce a second steady switching signal until the concurrence of an enable pulse and a negative difference output signal from said subtractor; and means to provide a comparison signal in response to either of said steady switching signals.

9. A device for comparing two binary coded words within a selected number of tolerance digits comprising a source of strobe pulses; a serial full subtractor; means responsive to said strobe pulses to read the words to be compared into said subtractor serially and in order of increasing significance whereby the non-tolerance digits and then the tolerance digits of the words are processed in the subtractor; a pulse counter arranged to count the number of digits read into the subtractor; means to preset the counter to a predetermined state such that it will overflow after counting the last-tolerance digit; means to produce a secondary preset pulse when the counter overflows; means responsive to a secondary preset pulse to reset the counter to a second state such that it will return to said predetermined state after counting an additional number of digits equal to the total number of digits in one of the words to be compared; means to produce an ENABLE pulse in response to each strobe pulse occurring after the counter overflows; means to produce a first steady switching signal until the concurrence of an ENABLE pulse and a positive difference output signal from said subtraction means; means to produce a second steady switching signal until the concurrence of an ENABLE pulse and a negative difference output signal from said subtractor; and means to provide a comparison signal in response to either of said steady switching signals.

10. A device for comparing two binary coded words within a selected number of tolerance digits comprising first and second storage means to store the words to be compared; a source of strobe pulses; means responsive to said strobe pulses to read each of the words out of their respective storage means serially and in order of increasing significance whereby the non-tolerance digits and then the tolerance digits of the words are processed; a serial full subtractor connected to said storage means so as to subtract one word from the other as individual digits are read out of the storage means; a pulse counter arranged to count the number of digits read out of the storage means; means to preset said counter so that it will overflow after the last non-tolerance digit is counted; a differentiating circuit connected to the output of said counter to provide a secondary preset pulse when the counter overflows; means connecting the output of said differentiating circuit to selected stages in the counter so that a secondary preset pulse can reset the counter; a flip flop connected to the output of the counter to provide a steady output voltage after the counter overflows; means to produce an ENABLE pulse in response to the concurrence of an output voltage from said flip flop and a strobe pulse; means to produce a first steady switching signal until the concurrence of an ENABLE pulse and a positive difference output signal from said subtraction means; means to produce a second steady switching signal until the concurrence of an ENABLE pulse and a negative difference output signal from said subtractor; and means to provide a comparison signal in response to either of said steady switching signals.

11. A device to compare two binary coded numbers within any one of a group of selected tolerances comprising individual means to store the two numbers to be compared; a source of strobe pulses; means responsive to said strobe pulse source to read information out of each storage means serially and in order of increasing significance; a binary full serial subtractor coupled to receive the information read out of each storage means; an output terminal on said subtractor; an inverter connected to said output terminal; first and second AND circuits connected to said output terminal and said inverter respectively whereby an output signal from the subtractor indicating a difference digit is applied to the first AND circuit whereas an output signal from the subtractor indicating a no difference digit is applied to the second AND circuit; a predetermined pulse counter coupled to receive pulses from said source of strobe pulses; means to preset said pulse counter to a selected count whereby the counter will produce an overflow voltage after receiving a selected number of strobe pulses; a third AND circuit connected to receive the overflow voltage from said pulse counter and pulses from said strobe pulse source; conducting means to convey an ENABLE pulse from said third AND circuit to said first and second AND circuits in response to the concurrence of a strobe pulse and an overflow voltage; first and second flip flops connected to receive pulses from said first and second AND circuits respectively; an output terminal on each of said flip flops, said output terminal being arranged to provide an output voltage until that flip flop is switched by a signal from the AND circuit connected to its input; a source of READ pulses; a fourth AND circuit connected to receive said READ pulses; said fourth AND circuit further being coupled to receive an output voltage from either one of the first and second flip flops; a third flip flop connected to receive a switching pulse from the fourth AND circuit; and an output terminal on said third flip flop connected to provide a comparison signal when this flip flop is switched by a pulse from the fourth AND circuit.

12. A device to compare two binary coded numbers within any one of a group of selected tolerances comprising individual means to store the two numbers to be compared; a source of strobe pulses; means responsive to said strobe pulse source to read information out of each storage means serially and in order of increasing significance; a binary full serial subtractor coupled to receive the information read out of each storage means; an output terminal on said subtractor; an inverter connected to said output terminal; first and second AND circuits connected to said output terminal and said inverter respectively whereby an output signal from the subtractor indicating a difference digit is applied to the first AND circuit whereas an output signal from the subtractor indicating a no difference digit is applied to the second AND circuit; a predetermined pulse counter coupled to receive pulses from said source of strobe pulses; means to preset said pulse counter to a selected count whereby the counter will produce an overflow voltage after receiving a selected number of strobe pulses; a first flip flop connected to be switched to the binary one state by an overflow voltage; a third AND circuit connected to receive pulses from said strobe pulse source and a voltage from the first flip flop when this flip flop is in the binary one state; conducting means to convey an ENABLE pulse from said third AND circuit to said first and second AND circuits in response to the concurrence of a strobe pulse and a voltage from said first flip flop; second and third flip flops connected to receive pulses from said first and second AND circuits respectively; an output terminal on each of said second and third flip flops, said output terminal being arranged to provide an output voltage until that flip flop is switched by a signal from the AND circuit connected to its input; a source of READ pulses; a fourth AND circuit connected to receive said READ pulses; said fourth AND circuit further being coupled to receive an output voltage from either one of the second and third flip flops; a fourth flip flop connected to receive a switching pulse from the fourth AND circuit; and an output terminal on said fourth flip flop connected to provide a comparison signal when this flip flop is switched by a pulse from the fourth AND circuit.

13. A device to compare two binary coded numbers within any one of a group of selected tolerances comprising in combination:

(a) a memory unit for storing a binary coded number;
(b) a register unit for storing a computed binary coded number;
(c) a source of strobe pulses coupled to said memory unit and to said register unit so as to read binary digital information out of each of these units serially and in order of increasing significance;
(d) a digital serial full subtractor connected to receive information from the memory unit and the register unit simultaneously;
(e) an output terminal on said subtractor;
(f) an inverter connected to said output terminal;

(g) means to produce ENABLE pulses after a selected number of strobe pulses have occurred;
(h) first and Second AND circuits connected directly to the subtractor output terminal and to the inverter respectively;
(i) means to conduct ENABLE pulses to said first and second AND circuits;
(j) first and second flip flops connected to receive switching pulses from the first and second AND circuits respectively;
(k) output terminals on each of said first and second flip flops; said output terminals being connected to provide a signal unitl the associated flip flop is switched by a switching pulse from the respective AND circuit;
(l) a third AND circuit;
(m) a source of READ pulses connected to said third AND circuit;
(n) said third AND circuit being further connected to receive output signals from either of said first and second flip flops;
(o) a third flip flop connected to receive switching pulses from the third AND circuit; and
(p) a comparison signal output terminal on said third flip flop connected to produce a comparison signal when this flip flop is switched by an output pulse from said third AND circuit.

14. A device to compare two binary coded numbers within any one of a group of selected tolerances comprising in combination:
(a) a source of strobe pulses;
(b) a predetermined pulse counter coupled to receive strobe pulses from said source, said pulse counter being arranged to provide an overflow signal after receiving a selected number of strobe pulses;
(c) a first AND circuit connected to receive strobe pulses from said source and an overflow signal from said counter, whereby an ENABLE pulse is produced in response to any strobe pulse occurring concurrently with an overflow signal;
(d) a digital subtractor connected to receive binary coded signals representative of a stored word and binary coded signals representative of a computed word simultaneously;
(e) an output terminal on the subtractor to provide a source of difference signals:
(f) an inverter connected to said output terminal to provide a source of inverted difference signals;
(g) second and third AND circuits connected to receive difference signals from said output terminal and inverted difference signals from said inverter respectively, said second and third AND circuits being further connected to receive ENABLE pulses from said first AND circuit;
(h) first and second flip flops connected to receive switching pulses from said second and third AND circuits respectively, said flip-flops being further constructed and arranged to provide an output voltage until the flip flop is switched by a pulse from the associated AND circuit;
(i) a source of READ pulses;
(j) a fourth AND circuit connected to receive a signal from the output of either of said first and second flip flops, said AND circuit being further connected to receive signals from said source of READ pulses;
(k) an output flip flop connected to receive switching pulses from the fourth AND circuit; and
(l) a comparison terminal on said output flip flop, said terminal being connected to provide a comparison signal when the flip flop has been switched by a signal from the fourth AND circuit.

15. A device to compare two binary coded numbers within any one of a group of selected tolerances comprising in combination:
(a) a source of strobe pulses;
(b) a predetermined pulse counted coupled to receive strobe pulses from said source, said pulse counter being arranged to provide an overflow signal after receiving a selected number of strobe pulses;
(c) a source of secondary preset pulses arranged to reset selected stages of the pulse counter in response to the buildup of an overflow signal;
(d) a first flip flop connected to be switched to the binary one state by an overflow signal;
(e) a first AND circuit connected to receive strobe pulses from said source and a signal from said first flip flop, whereby an ENABLE pulse is produced in response to any strobe pulse occurring while the first flip flop is in the binary one state;
(f) a digital subtractor connected to receive binary coded signals representative of a stored word and binary coded signals representative of a computed word simultaneously;
(g) an output terminal on the subtractor to provide a source of difference signals;
(h) an inverter connected to said output terminal to provide a source of inverted difference signals;
(i) second and third AND circuits connected to receive difference signals from said output terminal and inverted difference signals from said inverter respectively, said second and third AND circuits being further connected to receive ENABLE pulses from said first AND circuit;
(j) first and second flip flops connected to receive switching pulses from said second and third AND circuits respectively, said flip flops being further constructed and arranged to provide an output voltage until the flip flop is switched by a pulse from the associated AND circuit;
(k) a source of READ pulses;
(l) a fourth AND circuit connected to receive a signal from the output of either of said first and second flip flops, said AND circuit being further connected to receive signals from said source of READ pulses;
(m) an output flip flop connected to receive switching pulses from the fourth AND circuit; and
(n) a comparison terminal on said output flip flop, said terminal being connected to provide a comparison signal when the flip flop has been switched by a signal from the fourth AND circuit.

References Cited by the Examiner

UNITED STATES PATENTS 2,984,822 5/1961 Armstrong ---------- 340—149
3,030,609 4/1962 Albrecht ---------- 340—172.5

MALCOLM A. MORRISON, *Primary Examiner.*

K. F. MILDE, *Assistant Examiner.*